United States Patent
Kobayashi et al.

(10) Patent No.: US 6,699,031 B2
(45) Date of Patent: *Mar. 2, 2004

(54) NOX REDUCTION IN COMBUSTION WITH CONCENTRATED COAL STREAMS AND OXYGEN INJECTION

(75) Inventors: Hisashi Kobayashi, Putnam Valley, NY (US); Lawrence E. Bool, III, East Aurora, NY (US); William J. Snyder, Ossining, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/194,828

(22) Filed: Jul. 11, 2002

(65) Prior Publication Data

US 2003/0104328 A1 Jun. 5, 2003

Related U.S. Application Data

(63) Continuation-in-part of application No. 09/757,611, filed on Jan. 11, 2001, now abandoned.
(60) Provisional application No. 60/380,817, filed on May 15, 2002, and provisional application No. 60/380,818, filed on May 15, 2002.
(51) Int. Cl.[7] .............................. F23M 3/04; F23M 3/02; F23J 11/00
(52) U.S. Cl. ............................ 431/10; 431/8; 110/345
(58) Field of Search .......................... 431/10, 8, 351; 110/344, 345, 348

(56) References Cited

U.S. PATENT DOCUMENTS

| | | |
|---|---|---|
| 3,656,878 A | 4/1972 | Wright |
| 3,873,671 A | 3/1975 | Reed et al. |
| 4,329,932 A | 5/1982 | Takahashi et al. |
| 4,343,606 A | 8/1982 | Blair et al. |
| 4,388,062 A | 6/1983 | Bartok et al. |
| 4,408,982 A | 10/1983 | Kobayashi et al. |
| 4,427,362 A | 1/1984 | Dykema |
| 4,488,866 A | 12/1984 | Schirmer et al. |
| 4,495,874 A | 1/1985 | Greskovich et al. |

(List continued on next page.)

FOREIGN PATENT DOCUMENTS

| | | |
|---|---|---|
| DE | 4142401 | 6/1993 |
| EP | 0187441 | 7/1986 |
| EP | 0653590 | 11/1994 |

OTHER PUBLICATIONS

Michelfelder, S. et al., "Transfert de chaleur et pollution", Revue Generale De Thermique, No. 196 (Apr. 1978), p. 324 (with translation).

(List continued on next page.)

*Primary Examiner*—Alfred Basichas
(74) *Attorney, Agent, or Firm*—Donald T. Black

(57) ABSTRACT

NOx formation in the combustion of solid hydrocarbonaceous fuel such as coal is reduced by obtaining, from the incoming feed stream of fuel solids and air, a stream having a ratio of fuel solids to air that is higher than that of the feed steam, and injecting the thus obtained stream and a small amount of oxygen to a burner where the fuel solids are combusted.

20 Claims, 7 Drawing Sheets

U.S. PATENT DOCUMENTS

| | | | |
|---|---|---|---|
| 4,515,095 A | 5/1985 | Greskovich | |
| 4,541,796 A | 9/1985 | Anderson | |
| 4,556,384 A | 12/1985 | Laurenceau et al. | |
| 4,570,549 A | 2/1986 | Trozzi | |
| 4,596,198 A | 6/1986 | Greskovich et al. | |
| 4,627,366 A | 12/1986 | LaRue et al. | |
| 4,761,132 A | 8/1988 | Khinkis | |
| 4,797,087 A | 1/1989 | Gitman | |
| 4,863,371 A | 9/1989 | Ho | |
| 4,878,830 A | 11/1989 | Henderson | |
| 4,899,670 A | 2/1990 | Hansel | |
| 4,903,901 A | 2/1990 | Kim et al. | |
| 4,946,382 A | 8/1990 | Kobayashi et al. | |
| 4,957,050 A | 9/1990 | Ho | |
| 4,969,814 A | 11/1990 | Ho et al. | |
| 4,973,346 A | 11/1990 | Kobayashi | |
| 4,988,285 A | 1/1991 | Delano | |
| 5,000,102 A | 3/1991 | Ho | |
| 5,076,779 A | 12/1991 | Kobayashi | |
| 5,085,156 A | 2/1992 | Dykema | |
| 5,158,445 A | 10/1992 | Khinkis | |
| 5,186,617 A | 2/1993 | Ho | |
| 5,195,450 A | 3/1993 | Marion | |
| 5,201,650 A | 4/1993 | Johnson | |
| 5,203,859 A | 4/1993 | Khinkis et al. | |
| 5,213,492 A | 5/1993 | Ho | |
| 5,242,296 A | 9/1993 | Tuson et al. | |
| 5,291,841 A * | 3/1994 | Dykema | 110/347 |
| 5,308,239 A | 5/1994 | Bazarian et al. | |
| 5,350,439 A | 9/1994 | Ducrocq | |
| 5,387,100 A | 2/1995 | Kobayashi | |
| 5,411,394 A | 5/1995 | Beer et al. | |
| 5,413,476 A | 5/1995 | Baukal, Jr. et al. | |
| 5,439,373 A | 8/1995 | Anderson et al. | |
| 5,454,712 A | 10/1995 | Yap | |
| 5,601,425 A | 2/1997 | Kobayashi et al. | |
| 5,609,662 A | 3/1997 | Kobayashi et al. | |
| 5,611,682 A | 3/1997 | Slavejkov et al. | |
| 5,611,683 A | 3/1997 | Baukal, Jr. et al. | |
| 5,697,306 A | 12/1997 | LaRue et al. | |
| 5,725,366 A | 3/1998 | Khinkis et al. | |
| 5,832,847 A | 11/1998 | Liesse et al. | |
| 5,871,343 A | 2/1999 | Baukal, Jr. et al. | |
| 5,904,475 A | 5/1999 | Ding | |
| 5,924,858 A | 7/1999 | Tuson et al. | |
| 5,931,654 A | 8/1999 | Chamberland | |
| 6,007,326 A | 12/1999 | Ryan, III et al. | |
| 6,030,204 A * | 2/2000 | Breen et al. | 431/4 |
| 6,085,674 A | 7/2000 | Ashworth | |
| 6,113,389 A | 9/2000 | Joshi et al. | |
| 6,171,100 B1 | 1/2001 | Joshi et al. | |
| 6,206,949 B1 | 3/2001 | Kobayashi et al. | |
| 6,244,200 B1 | 6/2001 | Rabovitser et al. | |
| 6,276,928 B1 | 8/2001 | Joshi et al. | |
| 6,289,851 B1 | 9/2001 | Rabovitser et al. | |
| 6,314,896 B1 | 11/2001 | Marin et al. | |
| 6,325,003 B1 * | 12/2001 | Ashworth et al. | 110/345 |
| 6,357,367 B1 * | 3/2002 | Breen et al. | 110/345 |
| 6,394,790 B1 | 5/2002 | Kobayashi | |
| 6,398,546 B1 | 6/2002 | Kobayashi | |
| 6,409,499 B1 | 6/2002 | Feldermann | |
| 6,418,865 B2 | 7/2002 | Marin et al. | |
| 6,519,973 B1 | 2/2003 | Hoke, Jr. et al. | |

OTHER PUBLICATIONS

Sarofim, A.F. et al., "Strategies For Controlling Nitrogen Oxide Emissions During Combustion Of Nitrogen–Bearing Fuels", The American Institute of Chemical Engineers, (1978), No. 175, vol. 74, pp. 67–92.

Timothy, L.D. et al., "Characteristics Of Single Particle Coal Combustion", $19^{th}$ Symposium on Combustion, The Combustion Institute (1982), pp. 1123–1130.

Farmayan, W.F. et al., "$NO_x$ and Carbon Emission Control in Coal–Water Slurry Combustion", Sixth International Symposium on Coal Slurry Combustion and Technology, Orlando, FL, (1984).

"Oxygen Enriched Air/Natural Gas Burner System Development", Final Report, Gas Research Institute (1989), pp. 140 and 186–189.

Kobayshi, H. et al., "$NO_x$ Emission Characteristics of Industrial Burners and Control Methods Under Oxygen Enriched Combustion Conditions", International Flame Research Foundation, $9^{th}$ Members Conference, Noordwijkerhout (1989).

Baukal, C.E. et al., "$NO_x$ Measurements In Oxygen–Enriched, Air–Natural Gas Combustion Systems", Fossil Fuel Combustion Symposium, (Amer. Soc. Mech. Eng., 1990), pp. 75–79.

Baukal, C.E. et al., "Oxygen Enrichment Enhances Combustion", Air Products and Chemicals, Inc., (before 1992), pp. 17–23.

Panahi, S.K. et al., "Low–$NO_x$ Technologies For Natural Gas–Fired Regenerative Glass Melters", presented at Scandinavian Society of Glass Technology, Institute of Gas Technology (1992), pp. 1–15.

"Catalog of Technical Reports", Gas Research Institute, (Dec. 1992).

Eddings, E.G. et al. "Advances in the Use of Computer Simulations for Evaluating Combustion Alternatives", presented at the $3^{rd}$ CREST International Symposium on High Temperature Air Combustion and Gasification, Yokohama, Japan (Mar. 2000).

Takano, S. et al. "$CO_2$ Recovery from PCF Power Plant with $O_2/CO_2$ Combustion Process", IHI Engineering Review, Oct. 1995, pp. 161–164.

Campbell, D.A. et al. "Oxy–coal injection at Cleveland Ironworks", Ironmaking and Steelmaking, 1992, vol. 19 No. 2, pp. 120–125.

Riley, M.F. "Effect of Direct Oxygen Injection on Combustion of Injected Coal", Proc. $2^{nd}$ Internat. Cong. on the Sci. and Tech. of Ironmaking, ISS, 1998, pp. 683–688.

* cited by examiner

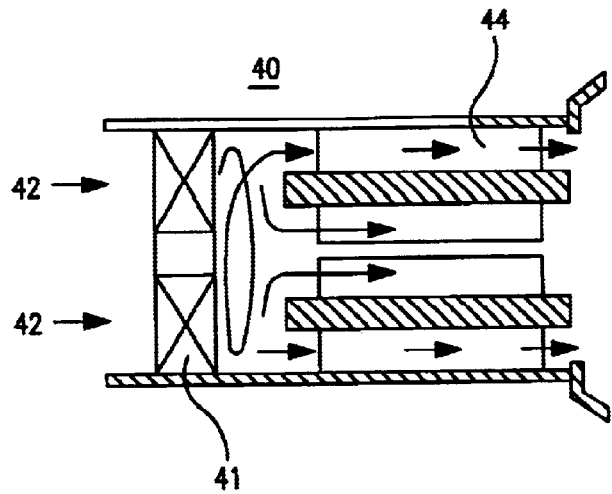
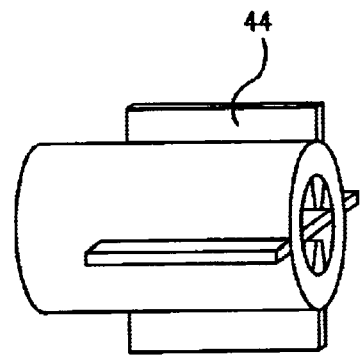
FIG. 4A  FIG. 4B
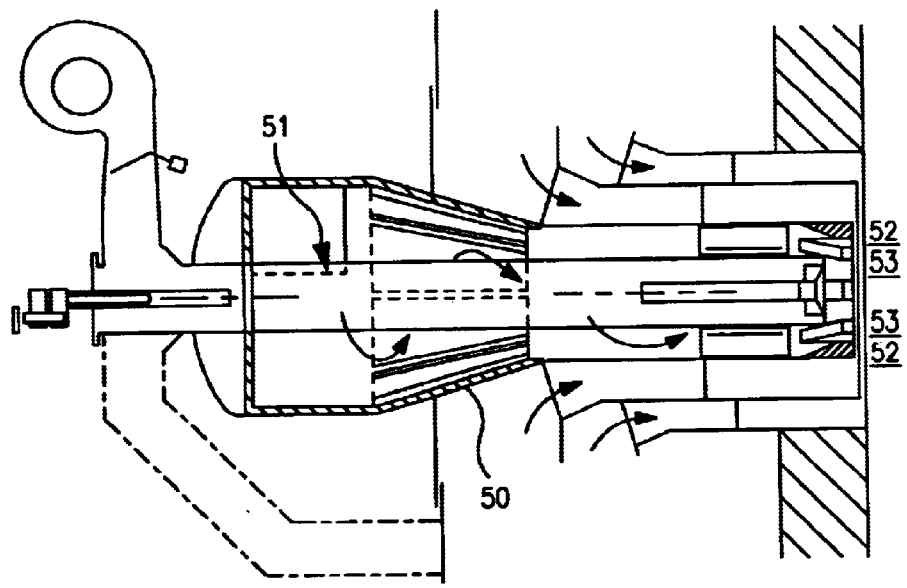
FIG. 5

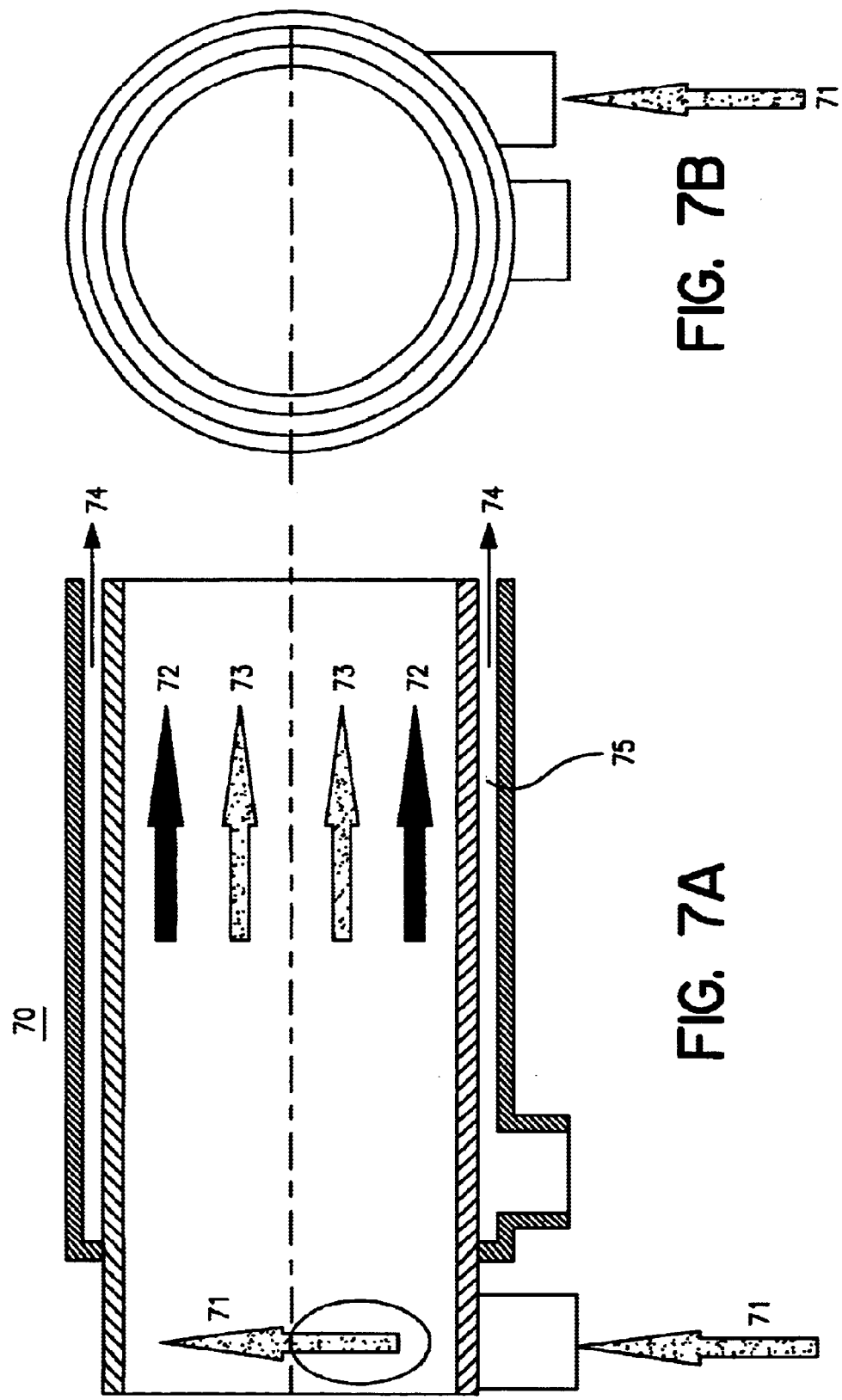

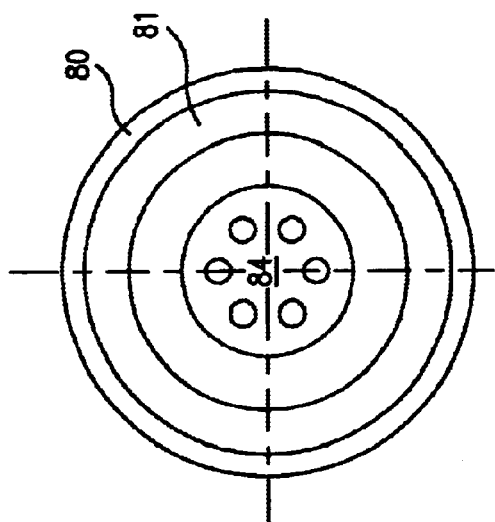
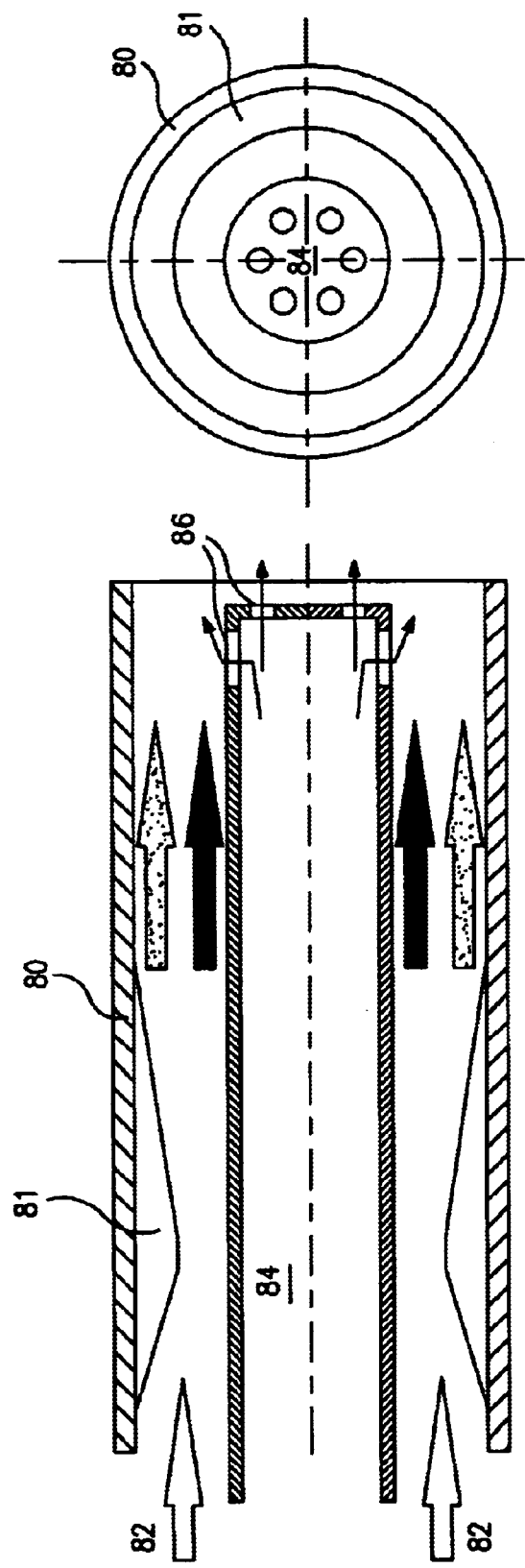
FIG. 8B
FIG. 8A

NOX REDUCTION IN COMBUSTION WITH CONCENTRATED COAL STREAMS AND OXYGEN INJECTION

This application is a continuation-in-part of U.S. patent application Ser. No. 09/757,611, filed Jan. 11, 2001 now abandoned, and claims priority from U.S. Provisional Application No. 60/380,817 filed May 15, 2002 and U.S. Provisional Application No. 60/380,818 filed May 15, 2002. The contents of said three applications are hereby incorporated herein by reference.

This invention was made with United States Government support under Cooperative Agreement No. DE-FC26-00NT40756 awarded by the Department of Energy. The United States Government has certain rights in the invention.

FIELD OF THE INVENTION

The present invention relates to the combustion of solid hydrocarbonaceous fuel such as coal, including fuel containing bound nitrogen, and to the reduction of generation of oxides of nitrogen in the course of that combustion.

BACKGROUND OF THE INVENTION

Combustion of coal in the furnaces of power plants continues to be a significant means of generating energy. As that combustion continues to be believed to cause atmospheric emissions of NOx which continue to be considered to contribute to atmospheric pollution, there is still substantial interest in identifying ways to reduce the amount of NOx emitted to the atmosphere in the course of that combustion.

One mode of reducing NOx emissions is adopting staged combustion techniques either or both using aerodynamically staged low NOx burners and over fire air ports. In the aerodynamically staged low NOx burner, mixing with fuel of a portion of the combustion air required for complete combustion of the fuel is delayed to produce a flame with a relatively large fuel rich flame area within the flame. In globally staged combustion or staged combustion with over fire air combustion air, providing only a portion of the total amount of oxygen required for complete combustion of the coal, is fed to the burner in the primary combustion zone with the fuel to create a fuel rich flame area followed by a fuel lean area to which the balance of the combustion air ("over fire air") is fed to complete the combustion of the fuel. The entire primary combustion zone, with the exception of the near burner area where combustion air is injected and not yet fully mixed with fuel, may become fuel rich under the globally staged combustion, providing a long residence time to reduce NOx emissions. To achieve fuel rich conditions, the prior art suggests reducing the amount of combustion air fed with the fuel to the primary combustion zone, adding combustible gases to this region, or using oxygen lean recycled flue gases. Adding pure oxygen at this point in the process is discouraged by prior teachings because it is inconsistent with the goal of eliminating excess oxygen from this area of the flame. In furnaces that burn pulverized coal, the pulverized coal is customarily conveyed to and fed through the burner as a flowing stream of the pulverized coal solids carried by and intimately mixed together with primary air (also know as "transport air"). The transport air also provides a portion of the combustion air requirement for the coal. The transport air may contain recirculated flue gas or combustion products of fuel used by in-duct burners to reduce the moisture content of coal. Reducing the amount of transport air is one recognized technique for reducing the amount of NOx formed by combustion of the coal. However, in most situations, reducing the amount of transport air is not feasible as it adversely impacts the performance of the coal pulverizer and the transport/distribution system.

A second technique identified in the prior art for reducing NOx emissions from pulverized coal burners is the incorporation of coal concentrators or splitters. Coal concentrators or splitters inertially separate the coal from its transport air at or close to the tip of the burner into two or more separate streams of the pulverized coal and air, wherein one or more of the streams has a higher ratio of coal solids to transport air than one or more other streams. These devices inject the two (or more) streams into the furnace separately or highly stratified. In this fashion, the fuel rich stream burns under more fuel rich conditions, and the fuel lean stream would provide additional air and some heat to drive the devolatilization and denitrification of the coal. These devices also allow greater turndown of the burner, because as the coal loading decreases with decreasing firing rate (less coal and same amount of transport air), the concentrators allow denser coal streams at the burner tip which help maintain ignition stability of the flame. Techniques of this type have become quite common in the industry and there are now many coal concentrator devices designed for this purpose. However, the proposed NOx regulations from coal fired boilers have become very stringent and the use of the state-of-the-art low NOx combustion system with a coal concentrator alone is not sufficient to meet the new NOx regulations. Furthermore, the use of a coal concentrator can result in high unburned carbon in ash.

Thus, there remains a need for improved methods for carrying out combustion of coal so as to reduce the emissions of NOx, without significant increases in unburned carbon in ash, preferably while taking advantage of the features provided by coal concentrators.

BRIEF SUMMARY OF THE INVENTION

The present invention comprises a method of combustion, comprising providing a feed stream of pulverulent solid hydrocarbonaceous fuel in a gaseous carrier, obtaining from said feed stream at least one obtained stream comprising said fuel and said carrier and having a ratio of fuel to carrier that is higher than the ratio of fuel to carrier of said feed stream, feeding said obtained stream and air from a burner to a combustion chamber, injecting oxygen into said obtained stream at or near said burner, such as by injecting it directly into said fuel as the fuel emerges from the burner or by adding oxygen to the air that is fed through said burner, and combusting the coal in said obtained stream in said combustion chamber with said air and oxygen in a flame that has a fuel-rich flame zone, wherein the amount of said oxygen is less than 25% of the stoichiometric amount required for complete combustion of said fuel and keeps the zone fuel-rich, while reducing the amount of air fed through said burner by an amount containing sufficient oxygen that the overall combustion zone stoichiometric ratio varies by not more than 10% compared to the stoichiometric ratio without said addition of oxygen.

In preferred embodiments, the fuel rich flame zone stoichiometric ratio is between 0.6 and 1.0 and more preferably between 0.7 and 0.85.

In another preferred embodiment, air is added from a source other than said burner into a region within said combustion chamber outside said fuel-rich flame zone to establish a fuel rich primary combustion zone, in an amount containing at least sufficient oxygen that the total amount of oxygen fed into said combustion chamber is at least the stoichiometric amount needed for complete combustion of said fuel. Preferably in this embodiment, the primary combustion zone stoichiometric ratio is between 0.6 and 1.0 and more preferably between 0.7 and 0.85.

It should be understood that the obtained one or more streams of coal and air having a higher ratio of fuel solids to air than that of the feed stream can be obtained, but are not necessarily obtained, as a stream or streams that are physically separate from the one or more streams of fuel solids and air of lower ratio of fuel solids to air that are also necessarily produced. That is, the obtained stream or streams of higher fuel solids to air ratio can constitute one or more regions that are part of a stream that also has one or more regions of lower fuel solids to air ratio.

The invention maintains the process goal of a high temperature, fuel rich flame zone by first concentrating the coal stream and then applying oxygen to the concentrated coal stream in a localized region at the exit of the burner. This allows a fairly high concentration of oxygen to be contacted with the coal and can maintain the stoichiometric ratio at or below the original air values depending on the degree of coal concentration achieved.

The combination of locally high concentrations of oxygen with low stoichiometric ratios creates ideal conditions for suppressing NOx formation. The use of oxygen in concentrated coal streams can achieve these conditions by excluding a portion of inerts, i.e., nitrogen contained in air, from the normal coal combustion process which allows higher temperatures to be achieved and results in overall lower NOx emissions from the process and less unburnt carbon in the ash. Also, by applying oxygen in this fashion, less oxygen is required to achieve the beneficial conditions desired, so the economics of oxygen usage is greatly enhanced.

As used herein, "stoichiometric ratio" means the ratio of oxygen fed, to the total amount of oxygen that would be necessary to convert fully all carbon, sulfur and hydrogen present in the substances comprising the feed to carbon dioxide, sulfur dioxide, and water.

As used herein, "NOx" means oxides of nitrogen such as but not limited to NO, $NO_2$, $NO_3$, $N_2O$, $N_2O_3$, $N_2O_4$, $N_3O_4$, and mixtures thereof.

As used herein, "staged combustion with low NOx burners" means combustion in a furnace wherein mixing with fuel of a portion of the combustion air required for complete combustion of the fuel is delayed to produce a flame with a relatively large fuel rich flame zone As used herein, "globally staged combustion" or "staged combustion with over fire air" means combustion in a furnace wherein only a portion of the combustion air required for complete combustion of the fuel is fed to the furnace with the fuel at the burners, and additional air (the "over fire air") constituting at least enough air to complete the combustion of the fuel is fed to the furnace not through or immediately adjacent any burner but instead through one or more inlets situated between the burner(s) and the furnace flue means, and is fed without an associated feed of fuel.

As used herein, "gaseous carrier" means a gaseous medium with no oxygen or with an oxygen content suitable to transport the fuel without a risk of ignition occuring in the fuel system, with the balance of the gaseous medium constituting inert species or the products of combustion from a prior process. In practice, the volume flow of the gaseous carrier must be adequate to entrain and displace the full size range of pulverized fuel particles.

As used herein, "bound nitrogen" means nitrogen that is part of a molecule that also contains carbon and hydrogen and optionally also oxygen.

BRIEF DESCRIPTION OF THE DRAWINGS

FIGS. 3–6 are cross-sectional representations of devices useful in the present invention for obtaining, from streams of fuel solids and air, streams having a ratio of fuel solids to air higher than that of the feed.

FIGS. 7–9 are cross-sectional representations of devices useful in the practice of the present invention.

DETAILED DESCRIPTION OF THE INVENTION

Although the subject invention is discussed below in terms of combustion of coal, and in terms of air being the gaseous carrier, both of which represent preferred embodiments of this invention, the techniques described would be applicable to any other pulverized fuel and any other gaseous carrier. The invention will be described with reference to the Figures, although a description that refers to the Figures is not intended to limit the scope of that which is considered to be the present invention.

In general terms, the invention first separates a coal/transport air stream into one or more streams (the "obtained" stream(s)) in which the first part of the stream has a ratio of fuel solids to air higher than that of the feed stream. Obtaining the "obtained" stream(s) will also produce one or more streams having a ratio of fuel solids to air lower than that of the inlet stream. A quantity of oxygen that is sub-stoichiometric relative to the fuel in the obtained stream (s) is then injected into or near the obtained stream at the burner to promote faster, higher temperature combustion and devolatilization of the fuel particles. Subjecting the fuel particles to these conditions early in their combustion history promotes the transformation of fuel-bound nitrogen to $N_2$ rather than NOx and facilitates the complete char burnout at a later period of time in the combustion process. The relatively dilute coal stream(s) also produced is or are used in other ways; for instance, they can be injected into the furnace away from the oxygen stream or even directed to a location separated from the burner (e.g. as over fire air, or as another staged air stream).

In general, the velocity of the feed stream and the more concentrated coal-air stream is 25 to 250 ft/sec and is preferably 50 to 200 ft/sec. In general, the ratio of fuel solids to air in the feed stream is 0.25 to 1.5 lb fuel/lb air and preferably 0.35 to 0.7 lb fuel/lb air. Generally, the ratio of fuel solids to air in the obtained more concentrated stream is 0.4 to 10 lb fuel/lb air and preferably 0.5 to 3 lb fuel/lb air.

Figure 1:
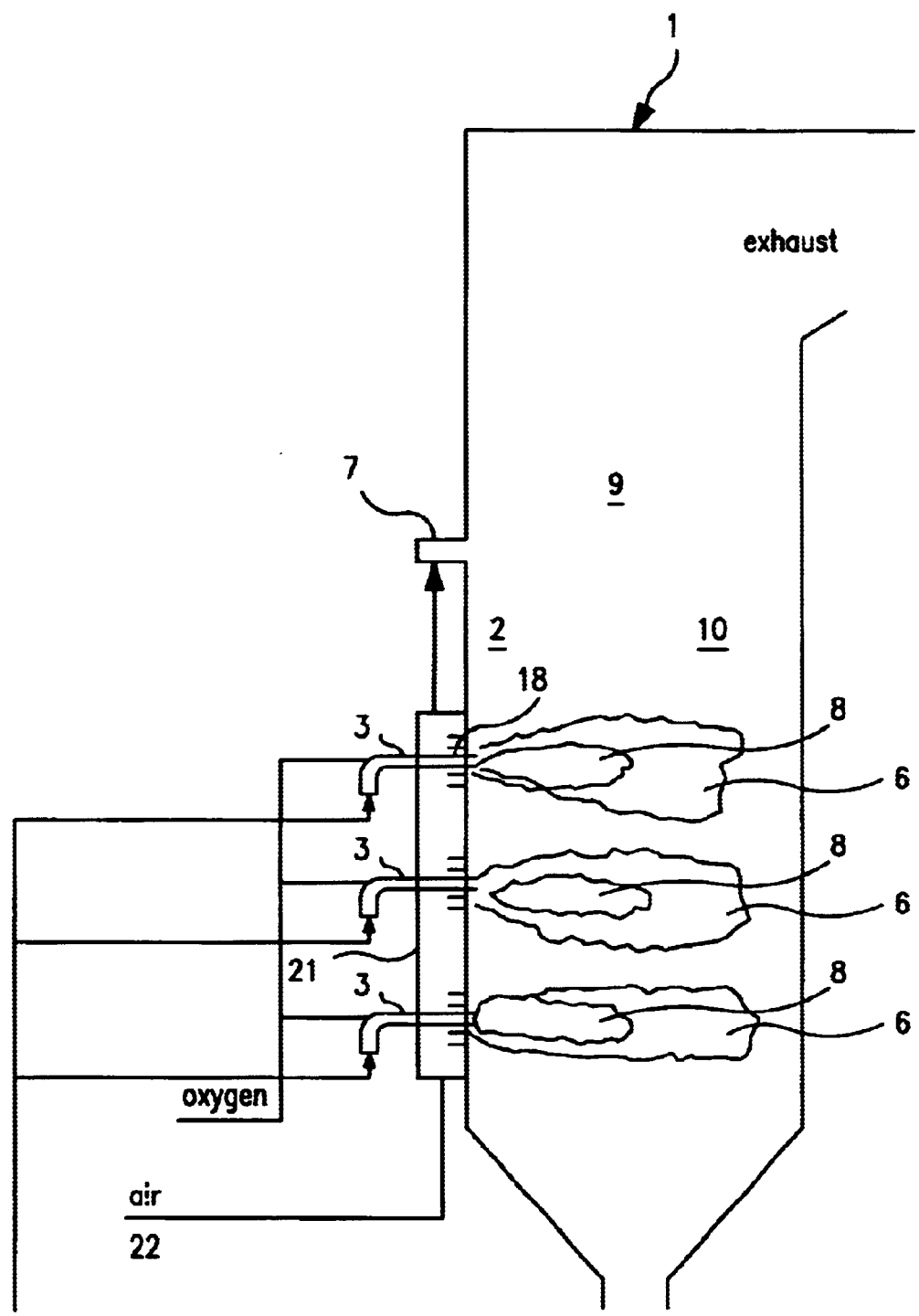
FIG. 1 is a cross-sectional representation of one embodiment of apparatus for carrying out the present invention.

FIG. 1 shows combustion device 1, which can be any apparatus wherein combustion is carried out in the interior 2 of the device. Preferred combustion devices include furnaces and boilers which are used to generate electric power by conventional means, not shown. Each burner 3 in a sidewall or end wall of combustion device 1 feeds fuel, air and oxygen from sources thereof outside the combustion device 1 into the interior 2 of combustion device 1. Suitable fuels include pulverulent (that is, finely divided) hydrocarbon solids, a preferred example of which is pulverized coal or petroleum coke.

Figure 2:
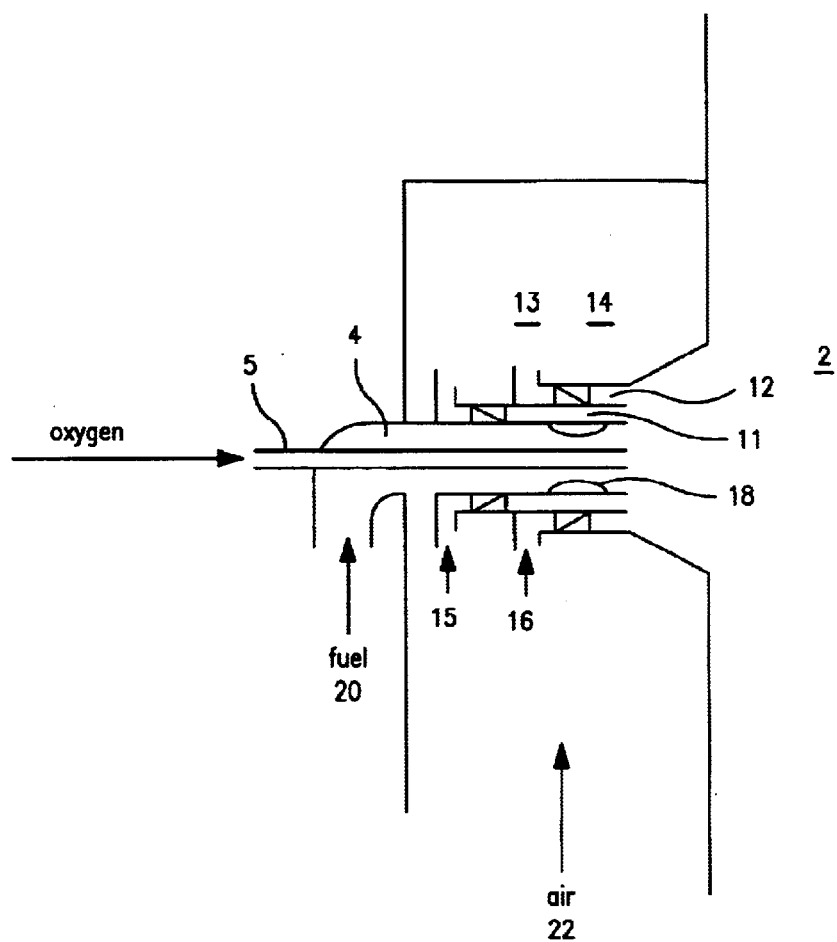
FIG. 2 is a cross-sectional representation of a burner useful for carrying out the present invention.

As seen in FIG. 1 and more closely in FIG. 2, burner 3 is preferably comprised of several concentrically arranged passages, although other constructions to the same effect can be used. The fuel is fed into combustion device 1 through annular passage 4. Preferably, the fuel and transport air are transported from a supply source 20 to one or more burners 3 where it passes through coal concentrator 18 and the resultant streams are propelled into the interior 2 of combustion device 1. An effective amount typically about 1.5 to 2.0 lb of primary air is used to transport 1 lb of coal, which corresponds to about 20% of the stoichiometric combustion air required for complete combustion of bituminous coal.

Combustion air 22 is supplied by a forced draft ("FD") fan (not shown) to one or more windboxes 21 and fed to air passages of one or more burners 3. Secondary combustion air 15 is fed through burner 3 into combustion device 1, preferably through concentrically arranged annular passages 11 surrounding the annular space 4 through which the hydrocarbon fuel is fed. Preferably tertiary combustion air 16 is fed through burner 3 into combustion device 1, preferably through concentrically arranged annular passages 12 surrounding the secondary air passage. Preferably combustion air is also fed through over fire air port 7 (seen in FIG. 1) into combustion device 1.

Preferred low NOx burners have primary (fuel), secondary and tertiary air passages for good aerodynamic adjustability. However, other low NOx burner designs using only primary and secondary air feeds can be used. Once the optimum settings with the three passages have been determined, the secondary air swirl vanes and passage can be designed to create about the same aerodynamic mixing characteristics as with the three-passage design. Alternatively, burners with an additional (quaternary) passage can be used (such as the RSFC™ burner described in U.S. Pat. No. 5,960,724).

Combustion is carried out between the hydrocarbon fuel, the oxygen in the combustion air, and oxygen, resulting in formation of a flame 6. The region 8 of the flame closest to the end of burner 3, that is, where the hydrocarbon fuel emerges from the burner, is a fuel-rich zone. The area of the flame 6 around its periphery, is relatively lean, as secondary and tertiary combustion air has not been fully reacted with fuel. When a sufficient amount of air is fed from over fire air port 7 for global combustion staging, the entire lower zone of the furnace, or primary combustion zone (PCZ) 10, below over fire air port 7 becomes fuel rich, except the areas near burners 3 where air is injected and not yet fully reacted with fuel.

Preferably, air fed through over fire air port opening 7 into the interior of combustion device 1 makes the primary combustion zone 10 more fuel rich and provides additional oxygen helping to achieve complete combustion of the fuel in the burnout zone 9. The oxygen in the combustion air fed through burner 3, combined with the oxygen fed at opening 7, are at least sufficient to enable complete combustion of the fuel, and typically contain 10 to 15 volume percent excess oxygen over the amount required for the complete combustion of the fuel.

Preferably, the secondary and tertiary combustion air are fed at the burner 3 so as to swirl about a longitudinal axis, thereby creating a recirculation zone near each burner and improving commingling of air and fuel. Swirl can be achieved by known techniques, such as providing deflectors, 13 and 14, in the annular passages for secondary and tertiary air flow of the burner which direct the flow of the streams in the desired swirling direction. It is preferred to provide a high degree of swirl, preferably a swirl number, as defined in "Combustion Aerodynamics", J. M. Beer and N. A. Chigier, Robert E. Krieger Publishing Company, Inc., 1983, of 0.6 to 2.0

Preferably the total amount of air fed through burner 3, i.e., the sum of primary, secondary and tertiary air, is between 60 and 100% of the stoichiometric air requirement for complete combustion. Most preferably the total amount of air fed through burner 3 is about 70 to 85% of the stoichiometric air requirement for complete combustion.

When oxygen is premixed or mixed rapidly into the coal transport stream using 20% of stoichiometric air and the overall combustion stoichiometric ratio is 1.15, the following average concentrations of oxygen in the transport air stream and in the overall combustion air are calculated.

| % SR air replaced with $O_2$ (*) | $O_2$ concentration in transport air (vol. %) | Avg. $O_2$ concentration in total combustion air (vol. %) |
| --- | --- | --- |
| 0 | 21.0 | 21.0 |
| 5 | 24.9 | 21.7 |
| 10 | 28.5 | 22.5 |
| 15 | 31.7 | 23.4 |
| 20 | 34.7 | 24.3 |
| 25 | 37.4 | 25.4 |

(*e.g. 5 cf of air replaced with 1.05 cf of pure $O_2$ to give the same amount of $O_2$)

The amount of oxygen fed to the burners should be sufficient to establish a stoichiometric ratio in the fuel-rich zone of flame 6 which is less than about 0.85. The amount of oxygen fed through line 5 should be less than 25% of the stoichiometric amount required for the complete combustion of the fuel. More preferably, the amount corresponds to less than 15% of the stoichiometric amount required for complete combustion of the fuel.

At the same time, the amount of secondary and tertiary combustion air fed through burner 3 into combustion device 1, need to be decreased by an amount corresponding to the amount of oxygen fed via lance 5. More specifically, the amount of secondary and tertiary, and quaternary, if used, combustion air fed through burner 3 should be reduced by an amount containing within 10% of the amount of oxygen fed via line 5 into the fuel.

NOx emission strongly depends on the local stoichiometric conditions. As injection of oxygen makes the local stoichiometric condition leaner, one has to consider the change in the local stoichiometric conditions after the oxygen injection. For example, injection of oxygen, equivalent to 10% of the stoichiometric air, into a locally rich zone at a stoichiometric ratio of 0.4 (SR=0.4), without changing the amount of combustion air that is fed, would alter the local stoichiometric conditions to SR=0.5 and would be expected to decrease NOx emissions substantially. Such an effect is much greater than that from "replacing 10% air with oxygen" while keeping the local stoichiometric condition constant at SR=0.4. If the same amount of oxygen is injected into the flame zone, without changing the combustion air, where the local stoichiometric condition is SR=0.95, NOx emission is expected to increase sharply if the local stoichiometric condition is increased to stoichiometric ratio= 1.05.

The invention maintains the process goal of a high temperature, fuel rich flame zone by first concentrating the coal stream which lowers the stoichiometric ratio and then applying oxygen to the concentrated coal stream in a localized region at the exit of the burner. This allows a fairly high concentration of oxygen to be contacted with the coal and can maintain the stoichiometric ratio at or below the original air values depending on the degree of coal concentration achieved.

The combination of locally high concentrations of oxygen with low stoichiometric ratios creates ideal conditions for suppressing NOx formation. The use of oxygen in concentrated coal streams can achieve these conditions by excluding inerts from the coal combustion process which allows higher temperatures to be achieved and results in overall lower NOx emissions from the process and less unburnt carbon in the ash. Also, by applying oxygen in this fashion, less oxygen is required to achieve the beneficial conditions desired, so the economics of oxygen usage is greatly enhanced. For example, when a coal feed steam containing 20% of stoichiometric air as transport air is concentrated and the concentrated coal stream now contains 10% of stoichiometric air, the following average concentrations of oxygen in the transport air stream and in the overall combustion air are calculated, assuming that oxygen is premixed or mixed rapidly into the concentrated coal and the overall combustion stoichiometric ratio is 1.15,

| % SR air replaced with $O_2$ (*) | $O_2$ concentration in transport air (vol. %) | Avg. $O_2$ concentration in total combustion air (vol. %) |
| --- | --- | --- |
| 0 | 21.0 | 21.0 |
| 5 | 28.5 | 21.7 |
| 10 | 34.7 | 22.5 |
| 15 | 39.9 | 23.4 |
| 20 | 44.4 | 24.3 |
| 25 | 48.2 | 25.4 |

(*e.g. 5 cf of air replaced with 1.05 cf of pure $O_2$ to give the same amount of $O_2$)

The above example shows that the oxygen requirement to achieve the same oxygen concentration in the transport air is halved by the use of the concentrator.

Injection or mixing of oxygen into the tertiary air and quaternary, if used, should be avoided in an aerodynamically staged burner without OFA. In theory, the optimization of local stoichiometric condition can be done with any oxidants including air. However, oxygen is more effective because only a small volume is required and local stoichiometric condition can be changed without a large impact on the overall aerodynamic mixing conditions of the flame.

The burner 3 includes structure 18 through which the feed stream of coal and air passes. From the structure one or more streams are obtained having a ratio of fuel solids to air greater than the ratio in the feed stream, and one or more streams having a ratio of fuel solids to air less than the ratio in the feed stream. Known coal concentrators useful to achieve this objective are primarily of an inertial design whereby the mass difference between the coal particle and the carrier gas is used to separate the two media. The coal particles will tend to travel in a straight line and are influenced primarily by the high velocity gas in a passage. The gas can be made to change direction and speed much more readily than the coal and hence allows for the two to be fairly easily separated.

Coal injectors for burners generally take one of three basic shapes: a center axial passage (i.e. a pipe), an annular passage (e.g. space between two concentric pipes) and a square or rectangular cross-section (e.g. tangentially fired boiler injectors) which could be classified in one of the two categories above, but may have other geometrical considerations which make it different from cylindrical coal injectors. The coal emanating from each of the burner shapes can be concentrated in a radial direction (i.e. edge versus center), or a circumferential direction (i.e. alternating areas of high and low density dispersed about the cross-section of the opening) or a combination of the two. The primary devices which concentrate the coal are venturies, which accelerate the mixture and then decelerate the gas portion, tangential inlets to produce swirling flows, vanes to produce swirling flows, and divider plates, alternating converging and diverging ducts which collect the particles and push them together. FIGS. 3 through 6 show some typical examples of these devices along with the concentrated coal streams they produce.

Figure 3:
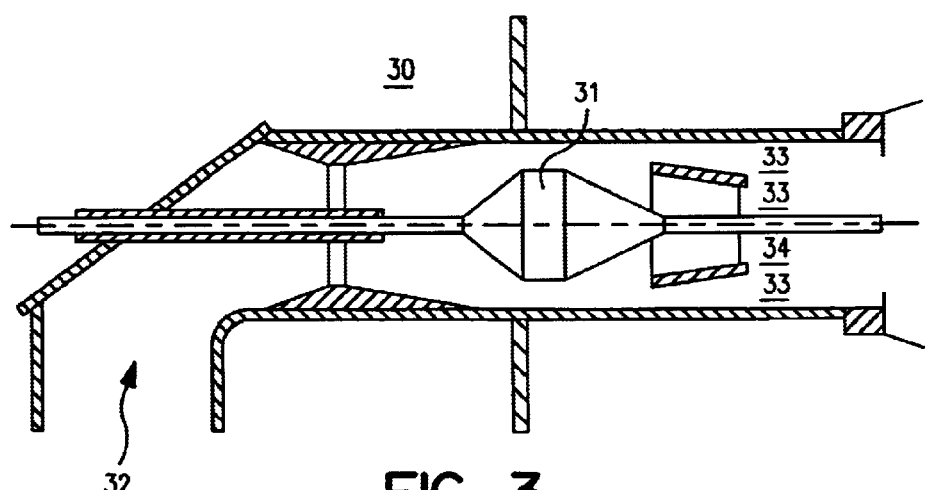

FIG. 3 shows a coal concentrator 30 that employs a venturi 31 to obtain coal-air streams having higher and lower coal-to-air ratios than the ratio in the incoming feed stream 32. Passing the feed stream through the constricted annular throat of the venturi 31 forms a more concentrated stream of coal in the region 33 closer to the inner surface of the unit 30, and a less concentrated stream of coal flowing through the center region 34

FIG. 4 shows a coal concentrator 40 having vanes 41 which impart swirling motion to the incoming feed stream 42. The swirling motion causes more of the coal solids to move to the radially outward region of the stream, obtaining in that region a more concentrated fuel steam. Vanes 44 straighten the flow as it emerges from the unit.

FIG. 5 shows a coal concentrator 50 wherein the feed stream 51 of coal and air is fed tangentially to the axis of the unit 50. The flow is then channeled through the unit, with the circumferential motion of the feed stream causing more of the fuel solids to move closer to the inner surface of the unit. This obtains the desired more concentrated stream of fuel solids, as a stream 52 surrounding the less concentrated stream 53.

Figure 6:
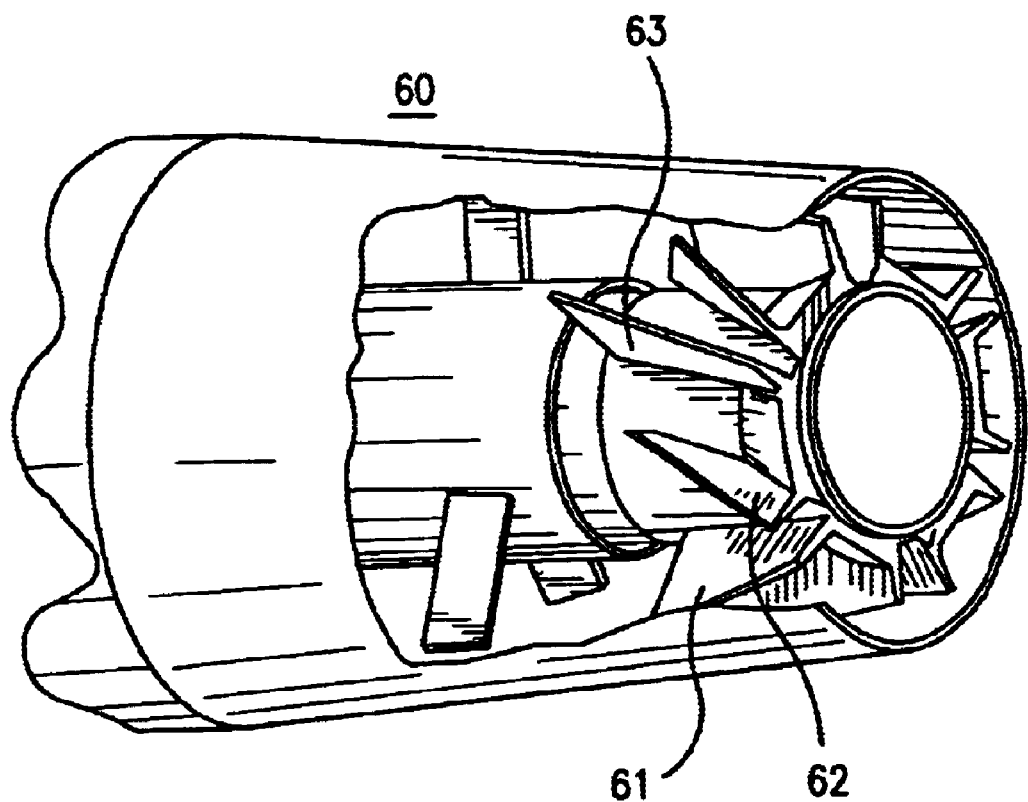

FIG. 6 shows a coal concentrator 60 provided with vanes that define alternating converging and diverging shaped passages to the flow of the incoming feed stream. For instance, vanes 61 and 62 converge toward each other, whereas vanes 62 and 63 diverge from each other. The more concentrated stream of coal in air is obtained in the passage between each converging pair of vanes, and a less concentrated stream is produced in the passages between each diverging pair of vanes. This type of concentrator produces streams wherein the concentration of fuel solids in air varies around the circumference of the unit, whereas the units depicted in FIGS. 3–5 produce streams wherein the concentration varies along the radius of the unit.

For plain pipes through which coal and air are flowing the coal is usually concentrated at the inside edge of the pipe wall, or less commonly at the center of the pipe. This is done because the more concentrated coal stream is usually positioned to interact with bluff body flame stabilizers. Under conditions where the more concentrated coal stream is obtained at the inner surface of the pipe, an annular flow of oxygen surrounding the coal pipe would be best. This flow should be injected in a direction along the axis of the coal stream, or converging towards the coal stream. This configuration is depicted in FIG. 7 wherein feed stream 71 is fed tangentially into unit 70 and emerges as stream 72, shown as dark arrows, having coal concentration higher than that of the feed stream 71, and stream 73, shown as lighter arrows, having coal concentration lower than that of feed stream 71.

Oxygen stream 74 is fed to annular passage 75 from which the oxygen exits and contacts the concentrated coal-air stream 72. Baffles or vanes can be employed at the burner tip to slow the swirling flow, but the coal usually exits in an outward swirling direction. The swirling motion due to the tangential coal injection also causes the air to move radially outward, although less so than the coal, therefore the coal/air ratio may not be as high as other concentrating techniques.

FIG. 8 depicts practice of the present invention using a unit which is based on a coal concentrator using a choking venturi 81 installed in pipe 80. Flow of feed stream 82 through venturi 81 causes coal solids to concentrate toward the center of the pipe 80 and leave the stream flowing closer to the inner surface of the pipe relatively coal-lean. In this situation, an oxygen lance 84 installed down the center of the pipe with axial or slightly diverging injection ports 86 will mix oxygen with the most concentrated coal stream. Depending on the position of the choking venturi 81, it may be necessary to provide a concentrically positioned baffle to prevent the concentrated coal stream from remixing with the dilute stream before exiting from the burner tip.

In both the cases discussed above, deflectors or swirling vanes can be installed in the pipe to take the radially stratified flow and break it into separate segments of dense and dilute coal streams around the circumference of the pipe. The same two oxygen injectors would be used in these cases, except that the end of the injectors would be plugged and holes would be drilled at different circumferential positions so that the oxygen injection point would coincide with the dense coal stream location.

Figure 9:
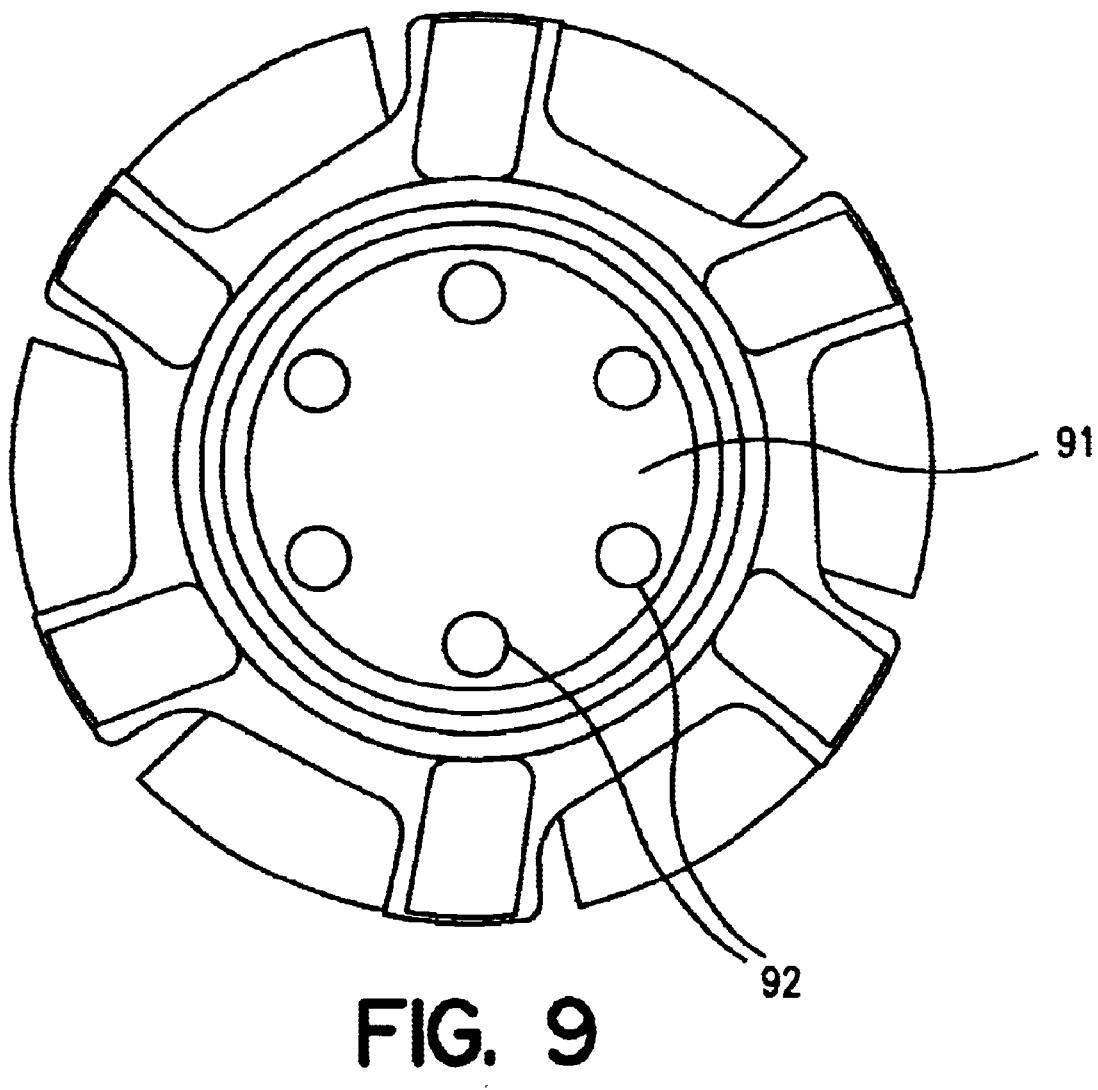

As shown in FIG. 9, the coal concentrator of the type shown in FIG. 6 can be adapted to the present invention by utilizing an axial oxygen lance 91 having a closed end and having orifices 92 drilled through the end of the lance equal in number to the number of streams in which the ratio of fuel solids to air is higher than that of the feed stream. Each orifice can be radial, or can converge or diverge relative to the flow of the concentrated streams, at a proper angle and located so as to intersect the concentrated coal streams emanating from the narrow gap between vanes. In cases where the dense coal stream is segmented circumferentially and directed to the outermost radial position, then an oxygen annulus with openings or slots located adjacent to the dense coal stream openings is preferred.

Because of their design, tangentially fired boilers do not have standard burners. In each corner of the square boiler is a bank of air and fuel injection nozzles which inject coal or air into the boiler to mix the reactants for combustion. Because of their non-cylindrical geometry, most of these type of injectors use baffles arranged into converging and diverging ducts. By having the same minimum cross-section at the end and beginning of these passages, the air flow into them is divided fairly equally. However, the converging passage acts like a funnel and collects more coal particles on the inlet side and concentrates them in the narrow outlet end to produce a concentrated coal stream. In this configuration, oxygen could be applied via the annulus surrounding the coal nozzle (currently a source of secondary air) or via multiple lances installed in the dense coal passage of the burner.

When the oxygen is injected into the dense coal stream, it should contact the stream and mix with it, but it is undesirable to have the oxygen jet create or disturb the overall flow pattern at the exit of the nozzle. With this in mind, the oxygen should be injected at a velocity similar to the coal velocity. A typical range is from 50% of the velocity of the obtained coal stream to 150% of the velocity of the obtained coal stream with 100% being the design target. With air streams being split and oxygen injectors occupying some volume in the coal duct, it may be difficult to determine precisely the coal velocity of the dense coal stream.

In addition to the inertial devices described above, other techniques can be used to concentrate the coal prior to mixing it with oxygen. External devices such as a cyclone could be mounted next to a burner and then the two stratified streams introduced to the burner through separate passages. The oxygen would then be injected somewhere within, along, or around the dense coal passage. External separation devices such as these can be extremely useful if the dilute coal stream is to be injected into the furnace somewhere distant from the dense coal stream.

What is claimed is:

1. A method of combustion, comprising providing a feed stream of pulverulent solid hydrocarbonaceous fuel in a gaseous carrier, obtaining from said feed stream at least one obtained stream comprising said fuel and said carrier and having a ratio of fuel to carrier that is higher than the ratio of fuel to carrier of said feed stream, feeding said obtained stream and air from a burner to a combustion chamber, injecting oxygen into said obtained stream at or near said burner, and combusting the coal in said obtained stream in said combustion chamber with said air and oxygen in a flame that has a fuel-rich flame zone, wherein the amount of said oxygen is less than 25% of the stoichiometric amount required for complete combustion of said fuel and keeps the zone fuel-rich, while reducing the amount of air fed through said burner by an amount containing sufficient oxygen that the overall combustion zone stoichiometric ratio varies by not more than 10% compared to the stoichiometric ratio without said addition of oxygen.

2. A method according to claim 1 wherein the fuel rich flame zone stoichiometric ratio is between 0.6 and 1.0.

3. A method according to claim 1 wherein the fuel rich flame zone stoichiometric ratio is between 0.7 and 0.85.

4. A method according to claim 1 further comprising adding air from a source other than said burner into a region within said combustion chamber outside said fuel-rich flame zone to establish a fuel rich primary combustion zone, in an amount containing at least sufficient oxygen that the total amount of oxygen fed into said combustion chamber is at least the stoichiometric amount needed for complete combustion of said fuel.

5. A method according to claim 4 wherein the primary combustion zone stoichiometric ratio is between 0.6 and 1.0.

6. A method according to claim 4 wherein the primary combustion zone stoichiometric ratio is between 0.7 and 0.85.

7. A method according to claim 1 wherein said fuel is coal.

8. A method according to claim 7 wherein the fuel rich flame zone stoichiometric ratio is between 0.6 and 1.0.

9. A method according to claim 7 wherein the fuel rich flame zone stoichiometric ratio is between 0.7 and 0.85.

10. A method according to claim 7 further comprising adding air from a source other than said burner into a region within said combustion chamber outside said fuel-rich flame zone to establish a fuel rich primary combustion zone, in an amount containing at least sufficient oxygen that the total amount of oxygen fed into said combustion chamber is at least the stoichiometric amount needed for complete combustion of said fuel.

11. A method according to claim 10 wherein the primary combustion zone stoichiometric ratio is between 0.6 and 1.0.

12. A method according to claim 10 wherein the primary combustion zone stoichiometric ratio is between 0.7 and 0.85.

13. A method according to claim 7 wherein said gaseous carrier is air.

14. A method according to claim 13 wherein the fuel rich flame zone stoichiometric ratio is between 0.6 and 1.0.

15. A method according to claim 13 wherein the fuel rich flame zone stoichiometric ratio is between 0.7 and 0.85.

16. A method according to claim 13 further comprising adding air from a source other than said burner into a region within said combustion chamber outside said fuel-rich flame zone to establish a fuel rich primary combustion zone, in an amount containing at least sufficient oxygen that the total amount of oxygen fed into said combustion chamber is at least the stoichiometric amount needed for complete combustion of said fuel.

17. A method according to claim 16 wherein the primary combustion zone stoichiometric ratio is between 0.6 and 1.0.

18. A method according to claim 16 wherein the primary combustion zone stoichiometric ratio is between 0.7 and 0.85.

19. A method according to claim 1 wherein said obtained stream is obtained by passing said feed stream through a venturi.

20. A method according to claim 1 wherein said obtained stream is obtained by passing said feed stream through apparatus that imparts a swirling motion to said feed stream.

* * * * *